United States Patent [19]

Brown

[11] Patent Number: 5,990,669
[45] Date of Patent: Nov. 23, 1999

[54] VOLTAGE SUPPLY REGULATION USING MASTER/SLAVE TIMER CIRCUIT MODULATION

[75] Inventor: Alan E. Brown, Georgetown, Tex.

[73] Assignee: Dell USA, L.P., Round Rock, Tex.

[21] Appl. No.: 08/991,087

[22] Filed: Dec. 15, 1997

[51] Int. Cl.$^6$ .............................. G05F 1/40; G05F 1/10; G06F 1/10
[52] U.S. Cl. ..................... 323/282; 323/222; 327/535; 327/540; 395/750
[58] Field of Search ................................. 323/282, 283, 323/222; 363/21, 71; 395/750; 327/535, 534, 540

[56] References Cited

U.S. PATENT DOCUMENTS

| | | | |
|---|---|---|---|
| 4,017,788 | 4/1977 | Stepp et al. | 323/226 |
| 4,809,150 | 2/1989 | Limuti et al. | 363/21 |
| 5,289,359 | 2/1994 | Ziermann | 363/21 |
| 5,317,155 | 5/1994 | King | 250/324 |
| 5,612,644 | 3/1997 | Runas | 327/535 |
| 5,774,736 | 6/1998 | Wright et al. | 395/750.07 |

OTHER PUBLICATIONS

National Semiconductor Corporation; LM555/LM555C Timer Data Sheet; May, 1997; pp. 1–12.

*Primary Examiner*—Peter S. Wong
*Assistant Examiner*—Rajnikankant B. Patel
*Attorney, Agent, or Firm*—Skjerven, Morrill, MacPherson, Franklin & Friel, LLP; Kent B. Chambers

[57] ABSTRACT

Electronic systems such as computer systems often utilize regulated voltage to meet system requirements such as accurate logic levels and predictable performance. A switching voltage regulator implements a pulse width modulator using two timer circuits, such as 555 class timers, configured in a master/slave relationship to provide modulation signals to control current flow to a voltage regulator output filter. The switching regulator employing the pulse width modulator may be arranged as a buck switching voltage regulator, and the pulse width modulator alternately turns switches in a switch bank ON (low impedance current path) and OFF (high impedance current path) to facilitate current flow to energy storage elements configured as an averaging filter. Furthermore, additional timer circuitry may be implemented to ensure nonoverlap of current flow in the switches. Additionally, feedback signals may provide error feedback to the pulse width modulator to facilitate voltage regulation, and a signal source, such as a processor, may be utilized to programmably control a voltage regulator output voltage by controlling pulse width duty cycles and/or periods.

31 Claims, 3 Drawing Sheets

VOLTAGE SUPPLY REGULATION USING MASTER/SLAVE TIMER CIRCUIT MODULATION

BACKGROUND OF THE INVENTION

1. Field of the Invention

This invention relates to electrical systems including computer systems and more particularly relates to using timer circuits configured as master and slave to regulate an output voltage of a voltage supply.

2. Description of the Related Art

Electronic systems, such as computer systems, employ power supplies to convert available time varying alternating current (AC) voltage levels to approximately zero frequency direct current (DC) voltage levels of, for example, +/−12 Volts (V), +/−5 V, and +/−3.3 V. Additionally, some electronic systems, such as portable or notebook computer systems, utilize batteries to supply power from DC voltage levels. The electronic systems utilize the DC voltages to operate electronic circuitry such as mother boards, disk drives, and peripheral circuit devices such as input/output devices.

Electronic systems generally depend upon reliable, regulated DC voltage levels from one or more voltage supply sources. For example, a computer system microprocessor utilizes voltage regulation provided by voltage regulators which are often physically local to the microprocessor. These voltage regulators support very high current transitions along with relatively low operational DC voltage demands. Switching power supplies often provide a general industry solution to this 'point-of-load' voltage regulation requirement of core power support. Switching power supplies often utilize pulse width modulation technology to modulate a voltage signal and supply current to an averaging filter. The pulse width modulation technology is typically presented as a single, specialized integrated circuit.

However, pulse width modulation integrated circuits may not be cost effective in a competitive market.

SUMMARY OF THE INVENTION

In one embodiment, it is desirable to utilize cost effective components to implement a reliable switching voltage regulator. For example, two timer circuits may be arranged in a master/slave relationship to effectively modulate voltage supplied from a voltage source. Modulated current from the voltage source may be supplied to a filter circuit to provide a regulated voltage output signal to circuitry such as a processor in a computer system. Furthermore, the regulated voltage output signal may be modified by programmably setting a control signal to the master timer circuit. '555' class timer circuits are relatively low cost and ubiquitous components and may be employed as both the master and slave timer circuits. The switching regulator may be arranged as a synchronous step-down or "buck" type switching voltage regulator. In one embodiment of the present invention, a computer system includes processor, and a memory coupled to the processor. The computer system further includes a voltage regulator coupled to the processor, the voltage regulator having a first switch coupled between a first voltage reference terminal and an output terminal coupled to the processor, the first switch having a control terminal. The voltage regulator further includes a master timer circuit having a control output signal terminal coupled to the first switch control terminal, a second switch coupled between a second voltage reference terminal and the output terminal, the second switch having a control terminal, and a slave timer circuit having a control input terminal coupled to the master timer circuit control output signal terminal and a control output terminal coupled to the second switch control terminal.

In another embodiment of the present invention, a method of regulating voltage in a computer system includes the steps of providing a control output signal from a master timer circuit to a slave timer circuit, and providing at least one state of the control output signal from the master timer circuit to a control terminal of a first switching circuit. The method further includes the steps of coupling a first voltage from a first voltage supply terminal to an energy storage circuit input terminal through the first switching circuit during a control output signal first state of the master timer circuit, providing a control output signal from the slave timer circuit to a control terminal of a second switching circuit, and coupling a second voltage from a second voltage supply terminal to the energy storage circuit through the second switching circuit during a control output signal second state of the master timer circuit using the control output signal from the slave timer circuit, wherein the two coupling steps are substantially nonoverlapping.

BRIEF DESCRIPTION OF THE DRAWINGS

Features appearing in multiple figures with the same reference numeral are the same unless otherwise indicated.

DETAILED DESCRIPTION OF THE PREFERRED EMBODIMENTS

The following description of the invention is intended to be illustrative only and not limiting. Electronic systems such as computer systems often utilize regulated voltage to meet system requirements such as accurate logic levels and predictable performance. Switching voltage regulators often provide an efficient solution to electronic system power requirements. Switching regulators generally employ a pulse width modulation scheme to adjust regulator current output to meet system power requirements while maintaining an approximately constant DC supply voltage level. Pulse width modulation control signals are often provided by specialized integrated circuits with built in timing circuitry. However, in a cost competitive environment, a more cost effective solution involves utilizing ubiquitous, economic, multisourced components to implement pulse width modulation in a voltage regulator. For example, a pulse width modulator having two timer circuits, such as 555 class timers, may be configured in a master/slave relationship to provide modulation signals to control current flow to a voltage regulator output filter. The switching regulator employing the pulse width modulator may be arranged as a buck switching voltage regulator, and the switches may be alternately turned ON (low impedance current path) and turned OFF (high impedance current path) to facilitate the current flow from a voltage source. Furthermore, additional timer circuitry may be implemented to ensure nonoverlap of current flow in the switches. Additionally, feedback signals may provide error feedback to the pulse width modulator, and signals from a signal source, such as processor 102, may be utilized to programmably control voltage regulator output voltage levels by controlling pulse width duty cycles and/or periods.

Figure 1:
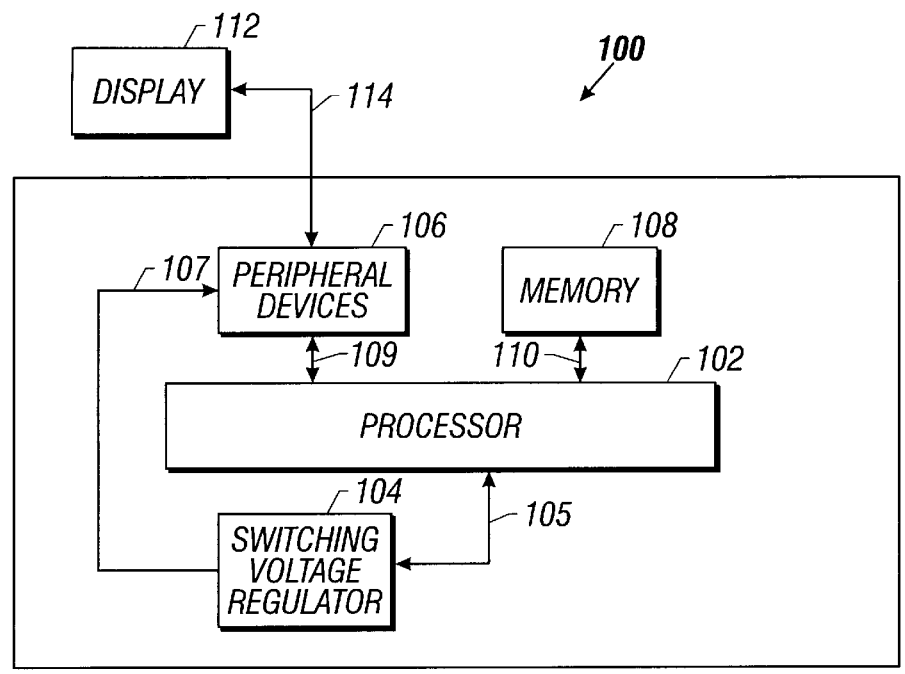
FIG. 1 is a computer system employing a switching voltage regulator with a master/slave timer circuit pulse width modulator.

Referring to FIG. 1, a computer system 100 includes a processor 102, such as a microprocessor, which receives regulated voltage from switching voltage regulator system 104 through bus 105. Additionally, in some embodiments, processor 102 may also control the power output of voltage regulator system 104 with output control signals. Voltage regulator system 104 may employ multiple voltage regulators. Regulated voltage of, for example, +12 V and +5 V, is also provided via bus 107 to peripheral devices 106 which may include well-known input/output devices. Processor 102 and peripheral devices 106 communicate with each other via bus 109. Memory 108 stores instructions and other data for processor 102 and is coupled to processor 102 via bus 110. Computer system 100 may also include a display device 112, connected to a video card input/output device via conductor 114, for displaying information to a user. The computer system 100 may be any computer system such as a portable or notebook computer system, a personal computer system, a work station computer system, and a server computer system.

Voltage regulator system 104 includes, in one embodiment, a switching, synchronous buck type voltage regulator which controls current flow to an averaging filter by modulating voltage signals at an input to the averaging filter. Modulation is controlled such that the averaging filter provides provide a steady voltage in static and dynamic power requirement environments.

Figure 2:
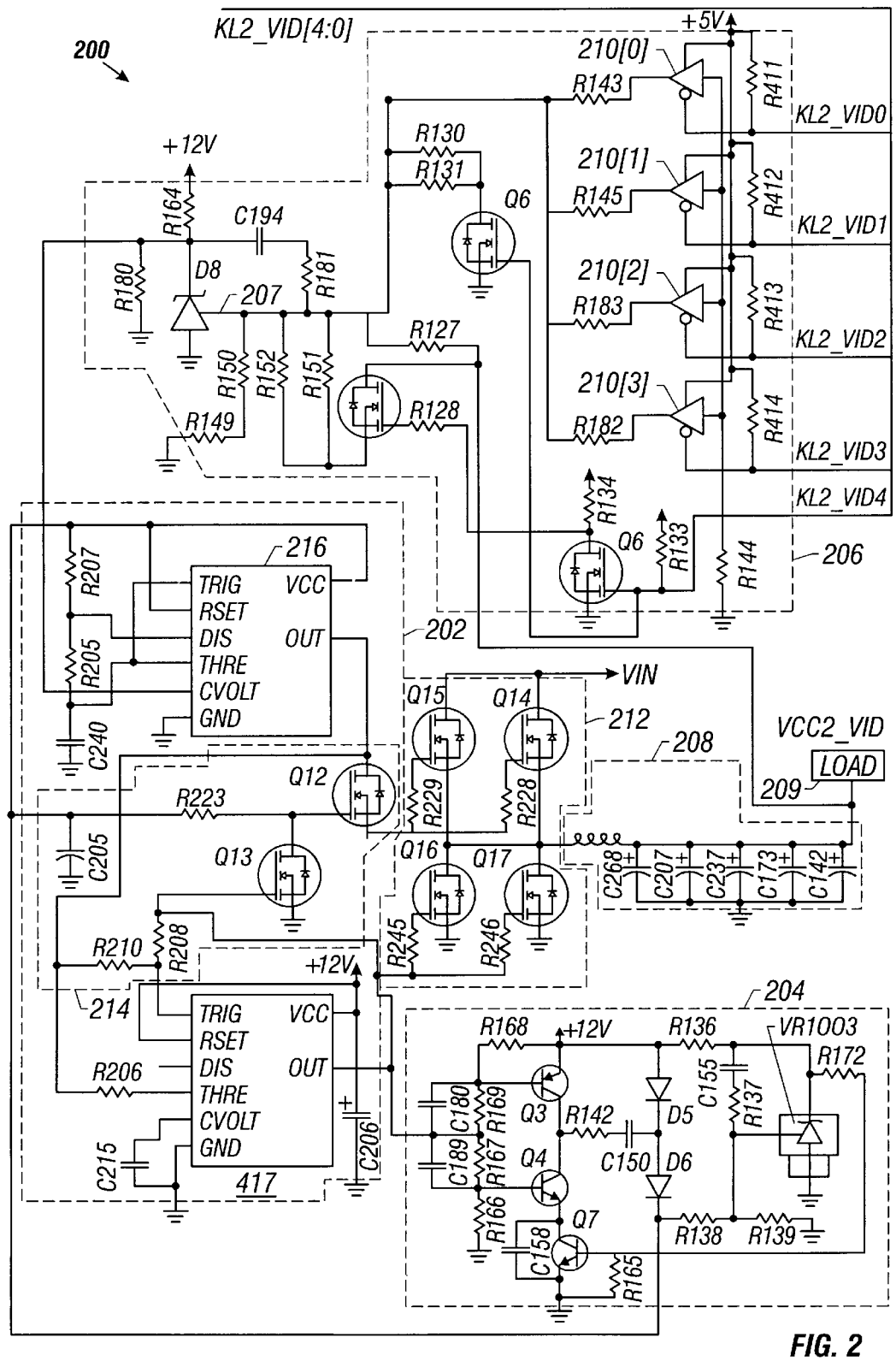
FIG. 2 is an embodiment of the switching voltage regulator of FIG. 1 with programmable pulse widths.
Figure 4A:
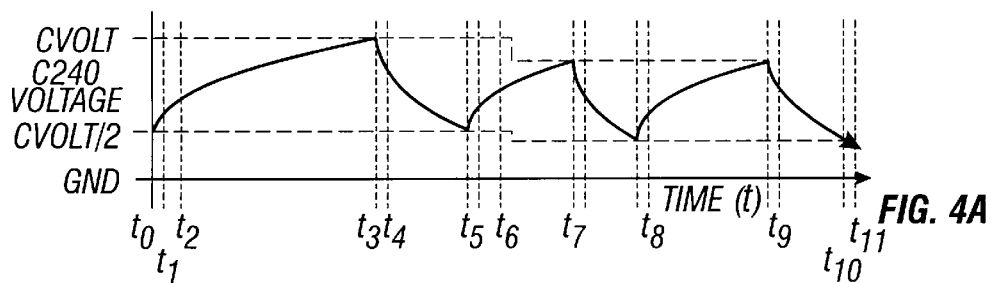
FIGS. 4*a* through 4*g* illustrates timing diagrams of signals at various terminals of the switching voltage regulator of FIG. 2.
Figure 4B:
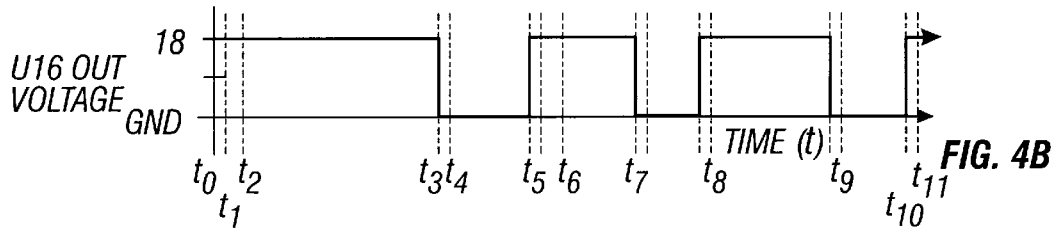
Figure 4C:
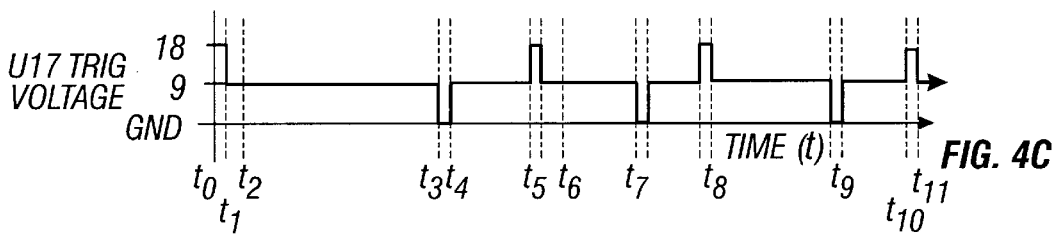
Figure 4D:
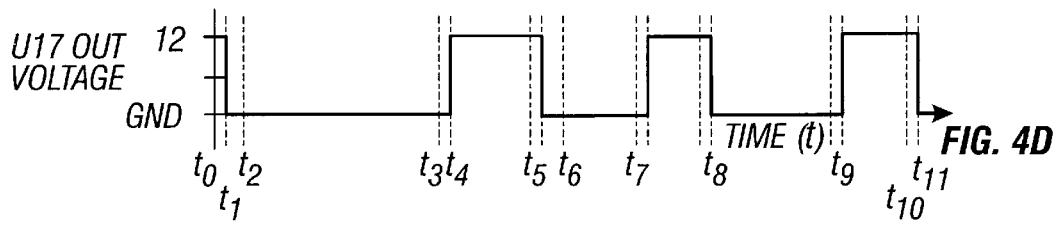
Figure 4E:
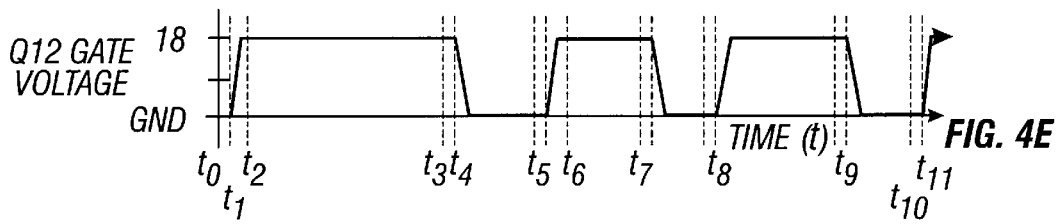
Figure 4F:
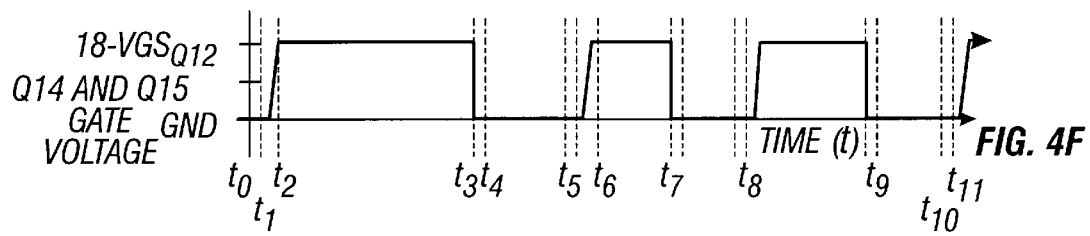
Figure 4G:
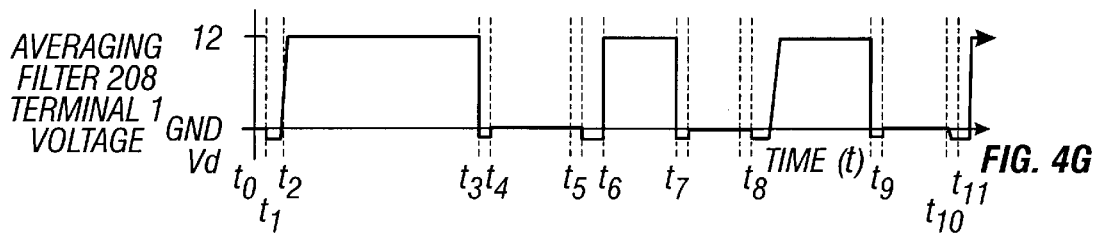

Referring to FIG. 2, one embodiment of voltage regulator system 104 includes voltage regulator 200 which configures discrete integrated circuit timers to cost effectively implement a programmable pulse width modulation circuit 202. Voltage regulator 200 provides a regulated output voltage VCC2_VID of, for example, 1.3 to 3.5 V.

Pulse width modulation circuit 202 includes 555 class timer circuit U16 which is configured as a master to 555 class slave timer circuit U17. '555' class timer circuits are ubiquitous in the art and are available from, for example, National Semiconductor of California, as an LM555 timer. The master timer circuit U16 utilizes a reference control voltage input signal CVOLT at terminal $CVOLT_{U16}$ as an internal reference voltage to the input signal voltage at terminal $THRE_{U16}$. The voltage at terminal THRE directly tracks the voltage across capacitor C240, where the 'U1X' subscript identifies the terminals of timer circuit U1X. When the voltage at terminal $THRE_{U16}$ surpasses the voltage at terminal $CVOLT_{U16}$, the output signal at the output terminal $OUT_{U16}$ of master timer circuit U16 falls to the voltage at terminal $GND_{U16}$ which is ground potential or zero V. When output terminal $OUT_{U16}$ is at ground potential, an internal discharge circuit (not shown) of master timer circuit U16 discharges capacitor C240 toward ground through resistor R205.

The input terminal $TRIG_{U16}$ of master timer circuit U16 is also connected to directly follow the voltage across capacitor C240, and the master timer circuit U16 output terminal $OUT_{U16}$ voltage rises to the voltage supply level $VCC_{U16}$ at terminal $VCC_{U16}$ when the capacitor C240 voltage discharges below one half of the input voltage CVOLT (CVOLT/2), where the 'U1X' subscript identifies the terminals of timer circuit U1X. When the output terminal $OUT_{U16}$ rises to the voltage supply level $VCC_{U16}$, the internal discharge circuit (not shown) of master timer circuit U16 is disabled, and capacitor C240 charges toward the voltage supply level $VCC_{U16}$ through series connected resistors R207 and R205. Thus the duty cycle of master timer circuit U16 may be set in a well-known manner by setting the ratio of resistors R207 to R205. The reset function of the master timer circuit U16 is not used, and, thus, the terminal $RSET_{U16}$ is tied to the supply voltage $VCC_{U16}$ of master timer circuit U16. Voltage $VCC_{U16}$ of master timer circuit U16 is in one embodiment +18 V and is generated from a +12 V power supply by a charge pump such as charge pump 204.

The functionality of slave timer circuit U17 is identical to the functionality of master timer circuit U16. The slave timer circuit U17 threshold input terminal $THRE_{U17}$ is connected through resistor R206 to directly track the output voltage at terminal $OUT_{U16}$. The threshold reference control voltage terminal $CVOLT_{U17}$ of slave timer circuit U17 is disabled and coupled to ground voltage through capacitor C215. The input terminal $TRIG_{U17}$ of slave timer circuit U17 follows the output voltages $OUT_{U16}$ and $OUT_{U17}$ of master timer circuit U16 and slave timer circuit U17 at respective output terminals $OUT_{U16}$ and $OUT_{U17}$ through a voltage divider circuit provided by the serial connection of resistors R218 and R208 between the respective output terminals $OUT_{U16}$ and $OUT_{U17}$. In one embodiment, resistors R218 and R208 are equal, and, thus, the slave timer circuit U17 input terminal TRIG potential is the average of the potentials at the respective output terminals $OUT_{U16}$ and $OUT_{U17}$. The discharge circuit of slave timer circuit U17 is unused, and the terminal $RSET_{U17}$ of slave timer circuit U17 is tied to the U17 supply voltage $VCC_{U17}$, +12 V, to disable the reset function of slave timer circuit U17.

The master timer circuit U16 output signal $OUT_{U16}$ has a period that is set by resistors R207 and R205, capacitor C240, and the voltage difference between CVOLT/2 (the trigger voltage reference) and the threshold reference control voltage terminal $CVOLT_{U16}$. With resistors R207 and R205 and capacitor C240 being fixed, the period of the master timer circuit U16 output signal at the output terminal OUT is increased by increasing the threshold reference control voltage at terminal CVOLT and is decreased by decreasing the voltage at terminal CVOLT.

Digital to analog converter ("DAC") and error amplifier 206 controls the voltage at terminal $CVOLT_{U16}$ and, thus, controls the period of the output signal $OUT_{U16}$ at terminal $OUT_{U16}$. DAC and error amplifier 206 includes an adjustable shunt regulator D8 which in one embodiment is a well-known TLV431A adjustable shunt regulator available from Semtech, Texas Instruments, and Raytheon. The .cathode of adjustable shunt regulator D8 is connected to the master timer circuit U16 terminal $CVOLT_{U16}$, and the output voltage $CVOLT_{U16}$ at the adjustable shunt regulator D8 cathode is determined in a well-known manner by modulating the reference current to the reference terminal 207 of the adjustable shunt regulator D8. Adjustable shunt regulator D8 has an internal reference voltage of 1.24 V. The reference current to adjustable shunt regulator D8 is determined by an input voltage, which is the regulated output voltage VCC2_VID of averaging filter 208, and programmable voltage divider circuitry. Setting R1 and R2 (FIG. 3) adjusts the gain of DAC and error amplifier 206 and effectively sets the steady state regulated output voltage VCC2_VID. DAC and error amplifier 206 and pulse width modulation circuit 202 respond to the error signal, provided by feeding back output voltage VCC2_VID as an input signal to the DAC and error amplifier 206, by adjusting control input voltage $CVOLT_{U16}$ to drive the output voltage VCC2_VID back towards the predetermined steady state output voltage of voltage regulator 200. Regulated output voltage VCC2_VID may deviate from the predetermined steady state output voltage in response to, for example, fluctuating power requirements of load 209. Load 209 may be, for example, circuitry of processor 102 (FIG. 1).

Processor 102 (FIG. 1) provides digital input signals KL2_VID[4:0] to modify the master timer circuit U16 control input voltage $CVOLT_{U16}$, where the 'U1X' subscript identifies the terminals of timer circuit U1X. In some embodiments, digital input signals KL2_VID[4:0] are hard wired to set a constant gain of DAC and error amplifier 208. The constant gain and regulated output voltage VCC2_VID feedback error signal allows voltage regulator 200 to maintain constant output voltage levels to load 209 during operation. Constant output voltage levels facilitate maintaining of constant logical levels during operation. Buffers 210[3:0] are in a high impedance state when either input signals KL2_VID[3:0] are respectively logical ones (e.g. 2–3.3 V) or when input signals KL2_VID[3:0] are respectively placed in high impedance states and, thus, no current flows through resistors R143, R145, R183, and R182, respectively. Pull-up resistors RN11 keep buffers 210[3:0] in a high impedance state if input signals KL2_VID[3:0], respectively, are in a high impedance state. However, input signals KL2_VID[3:0] respectively connect resistors R143, R145, R183, and R182 to ground potential via buffers 210[3:0], respectively, when input signals KL2_VID[3:0] are respective logical zeros (e.g. 0–1 V), where the 'U1X' subscript identifies the terminals of timer circuit U1X. Resistor R144 is for testing purposes. When resistors R143, R145, R183, and R182 are coupled to ground potential, they are also respectively coupled in parallel with serial connected resistors R150 and R149.

The regulated output voltage VCC2_VID feedback signal is connected to the reference terminal of adjustable shunt regulator D8 through resistor R127. When processor 102 input signal KL2_VID4 is at a logical zero state, N-channel metal oxide semiconductor field effect transistor ("MOSFET") Q5 is turned OFF (i.e. non-conductive). Otherwise, transistor Q5 is turned ON (i.e. conductive) by a logical one input signal KL2_VID4 or by pull-up resistor R153 tied to a +5 V source terminal. When transistor Q5 is OFF, pull-up resistors R128 and R129 couple a +12 V terminal to the gate of N-channel MOSFET Q4, which turns transistor Q4 ON to couple resistors R127, R151, and R152 in parallel. When transistor Q5 is ON, the gate of transistor Q4 is discharged to approximately ground potential, and resistors R151 and R152 are decoupled from the parallel configuration with resistor R127. Additionally, the gate of N-channel MOSFET Q6 is pulled up through resistor R153, which turns transistor Q6 ON, when input signal KL2_VID4 has a logical one state or when input signal KL2_VID4 has a high impedance state. A conducting transistor Q6 coupled terminals of resistors R130 and R131 to ground potential, thus, placing them in parallel with resistors R150 and R149. A logical zero input signal KL2_VID4 turns transistor Q6 OFF and decouples resistors R150 and R152 from the parallel configuration with resistors R150 and R149.

Figure 3:
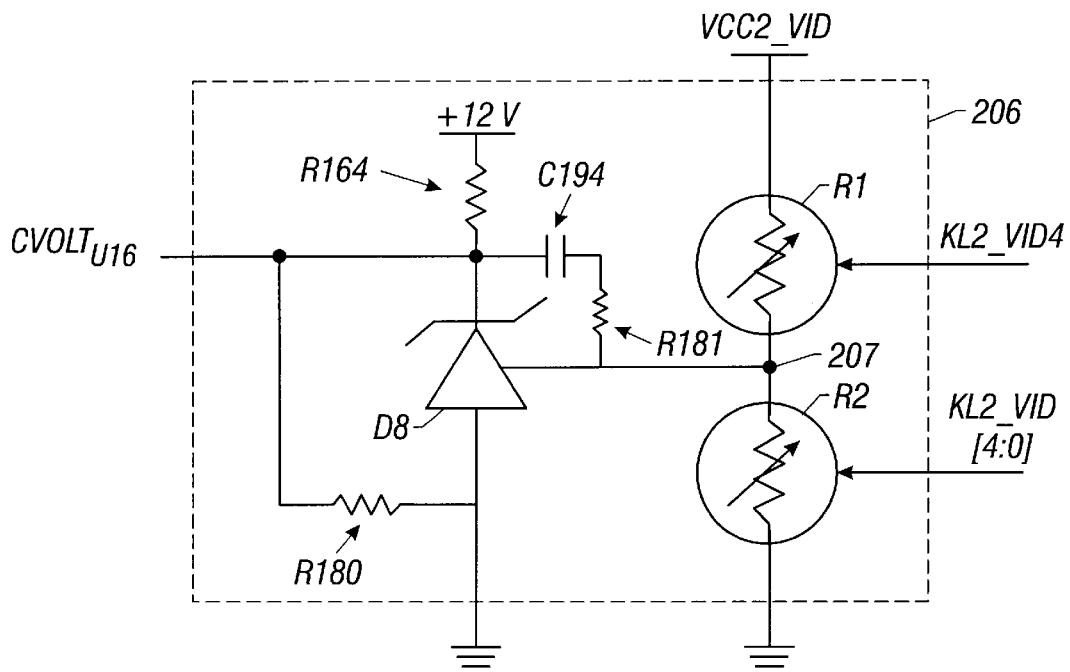
FIG. 3 illustrates an embodiment of an equivalent circuit of a digital to analog converter of the switching voltage regulator of FIG. 2.

Referring to FIGS. 2 and 3, by selecting the logical states of input signals KL2_VID[3:0], processor 102 controls the input current to the reference terminal of adjustable shunt regulator D8 and, thus, programmably controls the input control voltage at the master timer circuit U16 terminal $CVOLT_{U16}$. Resistors R1 and R2 represent the equivalent resistance which couple the reference terminal 207 of adjustable shunt regulator D8 to regulated output voltage VCC2_VID and ground potential, respectively. Processor 102 controls the equivalent resistances of resistors R1 and R2 with input signals KL2_VID[4:0] as described above. The steady state output voltage $CVOLT_{U16}$ of DAC and error amplifier 206 is related to resistors R1, R2, and regulated output voltage VCC2_VID by:

$$CVOLT_{U16} = A_V[(VCC2_{13}VID*(R1+R2)) - Vref\_D8] \quad [1],$$

where $A_V$ is the gain of adjustable shunt regulator D8 and Vref D8 is the internal reference voltage of adjustable shunt regulator D8 and is, for example, 1.24 V.

Note that the cathode of adjustable shunt regulator D8 is coupled to a +12 V terminal and ground potential through resistors R164 and R180, respectively, to provide +6 V voltage protection to adjustable shunt regulator D8. Also, capacitor C194 and resistor R181 are serially connected between the reference terminal 207 and cathode of adjustable shunt regulator D8 to provide loop compensation.

Various component values may be used to implement voltage regulator 200 to, for example, change regulated output voltage VCC2_VID and increase or decrease the resolution of input signals from processor 102 to DAC and error amplifier 206. Exemplary values of components depicted in FIG. 3 are provided in Table 1.

TABLE 1

| Component | Value (Resistor values are in ohms, capacitor values are in micro Farads, and inductor values are in micro Henrys, unless otherwise indicated) |
|---|---|
| C142 | 3900 |
| C150 | 1 |
| C155 | 4700 pF |
| C158 | .1 |
| C173 | 3900 |
| C189 | 680 pF |
| C190 | 680 pF |
| C194 | 4700 pF |
| C205 | 22 |
| C206 | 22 |
| C207 | 3900 |
| C215 | .01 |
| C237 | 3900 |
| C240 | .001 |
| C256 | 22 |
| C268 | 3900 |
| C275 | .1 |
| C294 | 1800 |
| C295 | 1800 |
| C296 | 1800 |
| C297 | 22 |
| C316 | 1800 |
| C317 | 1800 |
| L31 | 13.5 |
| L35 | 333 nH |
| R127 | 1.62 k |
| R128 | 47 k |
| R129 | 10 k |
| R130 | 1 k |
| R131 | 100 k |
| R136 | 2 k |
| R137 | 100 k |
| R138 | 24.9 k |
| R139 | 4.02 k |
| R142 | 2.7 |
| R143 | 20 k |

TABLE 1-continued

| Component | Value (Resistor values are in ohms, capacitor values are in micro Farads, and inductor values are in micro Henrys, unless otherwise indicated) |
|---|---|
| R144 | 220 |
| R145 | 10 k |
| R149 | 475 |
| R150 | 16.2 k |
| R151 | 1.62 k |
| R152 | 130 k |
| R153 | 1 k |
| R164 | 1 k |
| R165 | 470 |
| R166 | 1 k |
| R167 | 1 k |
| R168 | 150 |
| R169 | 470 |
| R172 | 1.5 k |
| R180 | 1 k |
| R181 | 270 k |
| R182 | 2.49 k |
| R183 | 4.99 k |
| R205 | 15 k |
| R206 | 2 k |
| R207 | 4.7 k |
| R208 | 2 k |
| R218 | 2 k |
| R223 | 2.2 k |
| R228 | 2.7 |
| R229 | 2.7 |
| R245 | 2.7 |
| R246 | 2.7 |
| RN11 | 2 k |

Exemplary component industry part numbers of devices depicted in FIG. 3 are provided in Table 2

TABLE 2

| Device | Industry part number |
|---|---|
| buffers [3:0] | 74ACT125 |
| Q4, Q5, Q6, Q12 and Q13 | 2N7002 |
| Q14–Q17 | 20N03 |
| U16, U17 | LM555 |
| Q7 and Q8 | 2222A |
| Q9 | 2907 |
| D8 | TLV431A |
| VR1003 | TL1431CD |
| D5 and D6 | 1N914 |

Referring to FIGS. 4a through 4g, collectively referred to as FIG. 4, and FIG. 2, the regulated output voltage VCC2_VID is controlled by modulating the voltage to the input terminal 1 of LC averaging filter 208, where terminal 1 of LC averaging filter 208 is the node connecting inductor L31 to transistors Q14, Q15, Q16, and Q17. This voltage modulation is controlled by the master timer circuit U16 and slave timer circuit U17 output signals which respond to the control signal $CVOLT_{U16}$ from DAC and error amplifier 206. Terminal 1 of the averaging filter 208 is the inductor L31 terminal opposite the inductor L31 terminal connected to a terminal of parallel connected capacitors C142, C173, C237, C207, and C268. A nonoverlap circuit 214 assists in preventing simultaneous conduction of N-channel MOSFETs Q16 and Q17 with N-channel MOSFETs Q14 and Q15.

At time to, the capacitor C240 voltage, i.e. the voltage across capacitor C240, and, thus, the voltage at the $TRIG_{U16}$ input terminal has fallen just below CVOLT/2. The output voltage at terminal $OUT_{U16}$ is, thus, set to $VCC_{U16}$, which in one embodiment is +18 V, and the terminal $THRE_{U17}$ of slave timer circuit U17 follows terminal $OUT_{U16}$ and exceeds ⅔ times $VCC_{U17}$. At time $t_1$, where $t_1-t_0$ represents the reset function propagation delays within slave timer circuit U17, the output voltage at terminal $OUT_{U17}$ falls to ground potential. When the output voltage at terminal $OUT_{U17}$ falls to ground, the gates of transistors Q16 and Q17 of switch bank 212 are discharged to ground potential and turn OFF. The gate of N-channel MOSFET Q13 is also discharged to ground potential and turns OFF, thus causing the gate of N-channel MOSFET Q12 to charge from +18 V, from charge pump 204, through resistor R223. The source of ON transistor Q12 follows the voltage at terminal $OUT_{U16}$ to charge the gates of transistors Q14 and Q15 in switch bank 212 to +18 V minus the gate to source threshold voltage of transistor Q12. As transistors Q14 and Q15 turn ON, the voltage at terminal 1 of the averaging filter 208 rises to the drain voltages, Vin, of transistors Q14 and Q15 which in one embodiment is a low-pass filtered +12 V. The low-pass filter (not shown) may be, for example, a bank of three parallel coupled 0.1 μF capacitors connected between source voltage terminal Vin and a ground voltage terminal, a bank of five 1800 μF capacitors connected between the drains of transistors Q14 and Q15 and a ground voltage terminal, and a 333 nH inductor connected in series between the non-grounded terminals of the capacitor banks. During the interval between times $t_2$ and $t_1$, after transistors Q16 and Q17 turn OFF and transistors Q14 and Q15 turn ON, the averaging filter 208 terminal 1 is clamped to a diode drop voltage Vd from ground by the internal Shottky diodes of transistors Q16 and Q17.

The capacitor C240 voltage will continue to increase toward $VCC_{U16}$ until the threshold reference voltage $CVOLT_{U16}$ at terminal $CVOLT_{U16}$ is reached at time $t_3$. At time $t_3$, the capacitor C240 voltage exceeds the threshold reference voltage $CVOLT_{U16}$, and master timer circuit U16 resets to ground voltage at terminal $OUT_{U16}$. The internal discharge circuit of master timer circuit U16 causes capacitor C240 to discharge toward ground as described above. Approximately simultaneously, the gates of transistors Q15 and Q16 follow the terminal $OUT_{U16}$ voltage drop and discharge to ground voltage, thus, turning OFF. The internal diodes of transistors Q16 and Q17 again clamp the voltage at terminal 1 of the averaging filter 208 to a diode drop below ground voltage.

Also at time $t_3$, the average of voltages at terminal $OUT_{U16}$ and terminal $OUT_{U17}$ is +15 V, and, thus, the trigger voltage at the slave timer circuit U17 $TRIG_{U17}$ terminal equals +15 V which exceeds the internal trigger reference voltage of CVOLT/2. After the internal set function delay of slave timer circuit U17 from time $t_3$ to $t_4$, the voltage at terminal $OUT_{U17}$ rises to $VCC_{U17}$ or +12 V. The gate voltages of transistors Q13, Q16, and Q17 follow the terminal $OUT_{U17}$ voltage rise causing transistors Q13, Q16, and Q17 to turn ON and pull the averaging filter 208 terminal 1 and gate of transistor Q12 to ground. Conducting transistors Q16 and Q17 generally dissipate less power than conducting diodes in a non-synchronous buck converter.

At time $t_5$, capacitor C240 again falls below CVOLT/2 and causes the master timer circuit U16 terminal $OUT_{U16}$ to set to $VCC_{U16}$ as described above. The transistor Q12 gate voltage then rises and causes the gate voltages of transistors Q14 and Q15 to charge to $VCC_{U16}$ as described above. At time $t_6$, the terminal 1 of averaging filter 208 again rises to +12 V. This series of master timer circuit U16 and slave timer circuit U17 output signal transitions at terminals $OUT_{U16}$ and $OUT_{U17}$, respectively, continue during operation of voltage regulator 200. However, the period during which capacitor C240 charges and discharges, which serves as a master timing control, may be altered by changing the reference voltage $CVOLT_{U16}$. The charging and discharging time, t, of capacitor C240 is defined by:

$$t = RC_{240} \ln\left(\frac{VCC_{U16}}{VCC_{U16} - V_{C240}}\right), \quad [2]$$

where $V_{C240}$ is the voltage across capacitor C240, R=R207+R205 for capacitor C240 charging times, t, and R=R205 for capacitor C240 discharging times, t.

The regulated output voltage VCC2_VID of averaging filter 208 is defined by:

$$VCC2\_VID \cong Vin * (\text{duty cycle of averaging filter 208}), \quad [3]$$

where Vin is the input voltage at the drains of transistors Q14 and Q15, and the duty cycle of averaging filter 208 is the ratio of a high voltage time duration at terminal 1 of averaging filter 208 to an associated voltage period at terminal 1 of averaging filter 208. The charging threshold of capacitor C240 is set by reference control voltage $CVOLT_{U16}$, and the discharging threshold of capacitor is set by reference control voltage $CVOLT_{U16}/2$. Thus, decreasing or increasing the charging threshold by X causes the discharging threshold to only decrease or increase, respectively, by X/2. Thus, by modifying the reference control voltage $CVOLT_{U16}$, the duty cycle of averaging filter 208 may be modified.

Referring to FIG. 4 and Equations [2] and [3], thus, decreasing reference control voltage $CVOLT_{U16}$ after time $=t_6$ causes VCC2_VID during the period $t_2$ to $t_6$ to be greater than the VCC2_VID during the periods $t_6$ to $t_8$ and $t_8$ to $t_{11}$. It is also clear from Equations [2] and [3] and FIG. 4 that increasing CVOLT causes VCC2_VID to increase.

In accordance with Equation [1], the reference voltage CVOLT depends upon the regulated output voltage VCC2_VID of averaging filter 208 and the values of R1 and R2 (FIG. 3) as set by digital control input signals KL2_VID [4:0]. Thus, from Equations [2] and [3] and FIG. 4, modifying $CVOLT_{U16}$ also modifies the regulated output voltage VCC2_VID of averaging filter 208.

Thus, timer circuits configured in a master/slave arrangement may be used to provide pulse width modulation to control a switching voltage regulator. Furthermore, the pulse width modulation period may be programmably modified to maintain a regulated voltage to load 209 coupled to the averaging filter 208.

While the invention has been described with respect to the embodiments and variations set forth above, these embodiments and variations are illustrative and the invention is not to be considered limited in scope to these embodiments and variations. For example, voltage regulator system 104 may include one or more voltage regulators such as voltage regulator 200. The voltage regulators may be identical to voltage regulator 200 or may utilize different duty cycles, component values, and/or input voltages to provide regulated output voltages at any desired voltage level. Additionally, the computer system 100 shown in FIG. 1 is illustrative and may be any computer system including a multiprocessor system. Accordingly, various other embodiments and modifications and improvements not described herein may be within the spirit and scope of the present invention, as defined by the following claims.

What is claimed is:

1. A computer system comprising:
   a processor;
   a memory coupled to the processor; and
   a voltage regulator coupled to the processor, the voltage regulator having_ a first switch coupled between a first voltage reference terminal and an output terminal coupled to the processor, the first switch having a control terminal to receive a first control signal to control the conductivity of the first switch;
   a master timer circuit having a control output signal terminal coupled to the first switch control terminal to provide a master control signal which controls a frequency of the first control signal;
   a second switch coupled between a second voltage reference terminal and the output terminal, the second switch having a control terminal; and
   a slave timer circuit having a control input terminal coupled to the master timer circuit control output signal terminal to receive the master control signal and a control output terminal coupled to the second switch control terminal to provide a slave control signal, which is distinct from the master control signal to the second switch control terminal to control the conductivity of the second switch.

2. The computer system of claim 1 wherein the voltage regulator further comprises an energy storage circuit coupled between the output terminal and the processor.

3. The computer system of claim 1 further comprising:
   a pulse width control circuit having an input terminal coupled to the processor and an output terminal coupled to an input control terminal of the master timer circuit.

4. The computer system of claim 3 wherein the pulse width control circuit is a digital to analog converter having an analog output terminal and a digital input terminal.

5. The computer system of claim 1 further comprising:
   a nonoverlap circuit coupled between the master timer circuit and the slave timer circuit to prevent simultaneous conduction of the first and second switch.

6. The computer system of claim 1 wherein the first switch is comprised of a first plurality of parallel coupled transistors, and the second switch is comprised of a second plurality of parallel coupled transistors.

7. The computer system of claim 5 wherein:
   during an operating state of the voltage regulator, the first control signal oscillates between a conductive state and a non conductive state at the frequency,
   wherein the first control signal transitions from the conductive state to the non conductive state in response to the master control signal transitioning from a first state to a second state;
   wherein the non overlap circuit delay circuit delays the change in state of the first control signal from the non conductive state to the conductive state in response to the master control signal transitioning from the second state to the first state until the slave control signal transitions to a non conductive state.

8. The computer system of claim 1 further comprising:
   a nonoverlap circuit coupled between the master timer circuit and the slave timer circuit to prevent simultaneous conduction of the first and second switch.

9. A computer system comprising:
   a first switch coupled between a first voltage supply terminal and a voltage supply output terminal and having a control terminal to receive a first control signal to control the conductivity of the first switch, the first control signal having a conducting state and a non conducting state;

a second switch coupled between a second voltage supply terminal and the voltage supply output terminal and having a control terminal;

a master timer circuit having an output terminal coupled to the first switch control terminal to provide a master control signal which controls a frequency of the first control signal; and a slave timer circuit having an input terminal coupled to the master timer circuit output terminal to receive the master control signal and having an output terminal coupled to the second switch control terminal to provide a slave control signal, which is distinct from the master control signal, to the second switch control terminal to control the conductivity of the second switch, the slave control signal having a conducting state and a nonconducting state, wherein respective conducting states of the first control signal and the slave control signal are non-overlapping.

10. The computer system as in claim 7 wherein the input terminal of the slave timer circuit is a threshold input terminal, the slave timer circuit further comprising:

a third switch coupled between the master timer circuit output terminal and the first switch control terminal, wherein the state of the slave timer circuit output terminal is capable of controlling the conductivity of the third switch;

a voltage divider coupled between the respective output terminals of the master timer circuit and the slave timer circuit; and a trigger terminal coupled to the voltage divider circuit wherein a state of the trigger terminal follows an approximate average of the respective states of the master timer circuit and slave circuit output terminals.

11. The computer system as in claim 9 wherein the master timer circuit further includes a control terminal, wherein the master timer circuit is capable of modifying the states of the master timer circuit output terminal in response to a control signal asserted on the master timer circuit control terminal.

12. The computer system as in claim 11 wherein the master timer circuit is capable of modifying the states of the master timer circuit output terminal by modifying a period of the master timer circuit output terminal states.

13. The computer system as in claim 9 further comprising:

a processor having a voltage terminal coupled to the voltage supply output terminal; and a memory coupled to the processor.

14. The computer system as in claim 13 further comprising a display device coupled to the processor.

15. The computer system as in claim 9 wherein the computer system is a server computer system.

16. The computer system as in claim 9 wherein the computer system is a work station computer system.

17. The computer system as in claim 9 wherein the first switch includes a plurality of parallel coupled field effect transistors.

18. The computer system as in claim 9 wherein the master timer circuit includes a 555 class timer, and the slave timer circuit includes a 555 class timer.

19. The computer system as in claim 9 wherein the master timer circuit further includes a control terminal, and the master timer circuit is responsive to a control signal on the master timer circuit control terminal to modify the state of the master timer output terminal, the computer system further comprising:

a programmable control circuit to provide the control signal on the master timer circuit control terminal.

20. The computer system as in claim 19 wherein the programmable control circuit comprises:

a digital to analog converter.

21. The computer system as in claim 19 wherein the programmable control circuit comprises:

a programmably variable impedance network having a first terminal coupled to a second voltage supply terminal; and an adjustable shunt regulator having an input terminal coupled to the voltage supply output terminal and to an output terminal of the programmably variable impedance network.

22. A method of regulating voltage in a computer system comprising the steps of:

providing a control output signal from a master timer circuit to a slave timer circuit;

providing at least one state of the control output signal from the master timer circuit to a control terminal of a first switching circuit;

coupling a first voltage from a first voltage supply terminal to an energy storage circuit input terminal through the first switching circuit during a control output signal first state of the master timer circuit;

providing a control output signal from the slave timer circuit to a control terminal of a second switching circuit; and coupling a second voltage from a second voltage supply terminal to the energy storage circuit through the second switching circuit during a control output signal second state of the master timer circuit using the control output signal from the slave timer circuit, wherein the two coupling steps are substantially non-overlapping.

23. The method as in claim 22 wherein the step of providing a control output signal from the master timer circuit comprises the step of:

providing a threshold voltage output signal from the master timer circuit to the slave timer circuit; and the method further comprising the step of:

providing a trigger voltage for the slave timer circuit from the threshold voltage output signal from the master timer circuit and the control output signal from the slave timer circuit.

24. The method as in claim 22 further comprising the steps of:

providing a filtered voltage supply output signal from the energy storage circuit to a processor.

25. The method as in claim 22 further comprising the steps of:

programmably setting a period of the control output signal from the master timer circuit.

26. The method as in claim 25 wherein the step of programmably setting a period of the control output signal from the master timer circuit comprises the steps of:

converting a digital signal to an analog signal; and coupling the analog signal to a control terminal of the master timer circuit.

27. The method as in claim 25 wherein the step of programmably setting a period of the control output signal from the master timer circuit comprises the steps of:

modifying an input reference signal to an adjustable shunt regulator; and providing an output signal from the adjustable shunt regulator to a control terminal of the master timer circuit.

28. The method as in claim 22 wherein the master timer circuit is a 555 class timer circuit, and the slave timer circuit is a 555 class timer circuit.

29. The method as in claim 22 wherein the step of coupling a first voltage to the energy storage circuit comprises the step of:

providing the control output signal from the master timer circuit to a first switching circuit;

and wherein the step of coupling the second voltage to the energy storage circuit comprises the step of:

providing the control output signal from the slave timer circuit to a second switching circuit.

30. The method as in claim 29 further comprising the steps of:

providing the control output signal of the slave timer circuit to a first input terminal of a nonoverlap circuit;

providing the control output signal from the master timer circuit to a second input terminal of the nonoverlap circuit; and preventing the first state of the control output signal from the master timer circuit from being provided to the first switching circuit during a conductive period of the second switching circuit.

31. The method as in claim 30 wherein the step of preventing comprises the steps of:

receiving the control output signal of the slave timer circuit with a control terminal of a third switching circuit coupled between a ground voltage and a control terminal of a fourth switching circuit;

coupling the control terminal of the fourth switching circuit to the ground voltage when the first switch conducts to prevent the fourth switching circuit from conducting; and receiving the control output signal of the master timer circuit with a current terminal of the fourth switching circuit.

* * * * *